United States Patent [19]

Ramagopal

[11] 3,912,839

[45] Oct. 14, 1975

[54] PRINTING OF REGENERATED CELLULOSE SAUSAGE CASING

[75] Inventor: G. R. Ramagopal, Appleton, Wis.

[73] Assignee: Tee-Pak, Inc., Chicago, Ill.

[22] Filed: Dec. 14, 1973

[21] Appl. No.: 425,057

Related U.S. Application Data

[63] Continuation-in-part of Ser. No. 48,814, June 8, 1970, abandoned.

[52] U.S. Cl. .............. 428/35; 427/261; 427/324; 427/390; 428/424
[51] Int. Cl.² .......................................... D06P 3/60
[58] Field of Search...... 117/15, 38, 45, 47 A, 76 F, 117/144, 145, 161 KP

[56] References Cited
UNITED STATES PATENTS

| | | | |
|---|---|---|---|
| 3,005,728 | 10/1961 | Bridgeford | 117/145 |
| 3,157,530 | 11/1964 | Kane | 117/76 F |
| 3,192,287 | 6/1965 | Pelzek et al. | 117/38 |
| 3,198,692 | 8/1965 | Bridgeford | 117/76 F |
| 3,279,424 | 10/1966 | Brown et al. | 117/161 KP |
| 3,316,189 | 4/1967 | Adams | 117/145 |
| 3,325,306 | 6/1967 | Caldwell | 117/15 |
| 3,794,515 | 2/1974 | Turbak et al. | 117/145 |

*Primary Examiner*—William D. Martin
*Assistant Examiner*—Sadie L. Childs
*Attorney, Agent, or Firm*—Neal J. Mosely; Russell L. Brewer

[57] ABSTRACT

In the printing of clear, regenerated cellulose or fiber reinforced regenerated cellulose sausage casings, improved adhesion of the ink to the casing and improved drying time for the imprint are obtained by first applying to a substantial proportion of the external surface of said casing a primer coating of a polymeric polyisocyanate, drying the primer coating, and then imprinting over the primer coated area with an oil based ink or a flexographic ink.

7 Claims, No Drawings

3,912,839

PRINTING OF REGENERATED CELLULOSE SAUSAGE CASING

CROSS REFERENCE TO RELATED APPLICATIONS

This application is a continuation-in-part of my earlier filed application having Ser. No. 48,814 filed June 8, 1970, now abandoned and the subject matter of said application is incorporated by reference.

BACKGROUND OF THE INVENTION

This invention relates to a new and improved process for printing regenerated cellulose sausage casings and more particularly to a process in which a regenerated cellulose sausage casing is provided with a primer coating prior to imprinting with either an oil base ink or a flexographic ink.

The printing of regenerated cellulose sausage casings has presented problems resulting from the manner of manufacture and the composition of such casings, and the method of use of the casings after printing. Regenerated cellulose sausage casings are normally manufactured by the viscose process. Viscose, of a suitable composition, is extruded through an annular die into a coagulating and regenerating bath to provide a hollow, thin-walled tube of coagulated and partially regenerated cellulose xanthate. The extruded tube is subsequently treated in an acid bath to thoroughly regenerate the cellulose, and is subsequently washed to remove by-products. The regenerated cellulose tube is eventually treated with an aqueous solution of glycerin and then dried and wound on reels. A type of casing known in the art as fibrous casing is manufactured by forming a long fiber hemp paper into a continuous tube, impregnating the tube with viscose, and treating the impregnated tube with a coagulating and regenerating bath to produce a paper reinforced tube of regenerated cellulose. In the manufacture of fibrous casing, the reinforcing paper or web represents about 35 – 40% wt. of the casing, and the regenerated cellulose and water and glycerin present as plasticizer constitute the balance of the casing. The fibrous casing is washed after the coagulation and regeneration baths and is finally subjected to treatment with an aqueous glycerin solution for plasticizing and is finally dried and reeled. Both the clear regenerated cellulose casings and fibrous casings contain about 35 – 50 g. of glycerin plus water per 100 g. of regenerated cellulose or regenerated cellulose plus paper, in the case of the fibrous casing. The relatively high proportion of glycerin and water in the casing is required to keep the casing soft and pliable so that it is not cracked or torn easily during handling and further processing. The high water and glycerin content in clear cellulose and fibrous casings, both dyed and undyed, has made the printing of such casings somewhat difficult. Common printing inks, both of the oil base and flexographic types, either do not adhere well or have excessively long drying times when used for printing regenerated cellulose sausage casings.

In the handling of casings subsequent to printing, the casings are cut to size for delivery to the meat packer. The meat packer then ties one end of the casing and soaks the casing in water to make it more flexible prior to stuffing with sausage meat. The soaked casing is then stuffed with a sausage emulsion to produce a bologna or similar sausage, and the other end of the casing is then tied to complete the formation of the sausage stick. In the preparation of the sausage, the stuffing of the casing with sausage emulsion results in the stretching of the casing beyond its original dimensions. The printing on the casing is, therefore, subject to considerable abuse as a result of the presoaking of the casing and the stretching of the casing during stuffing, with the result that imprint may come off during further handling of the sausage. It has, therefore, been necessary to provide printing on sausage casing which will not rub off even after the casing has been soaked in boiling water for 10 minutes. In fact, the resistance of the imprint to removal after soaking in boiling water for 10 minutes is a relatively standard test for satisfactory printing of sausage casings.

In the past, two major printing techniques have been used for the printing of regenerated cellulose sheet material and attempts have been made to use these techniques in the printing of regenerated cellulose sausage casings. The techniques commonly used for the printing of regenerated cellulose sheet are flexographic printing and printing with oil base printing inks. The application of flexographic printing to the printing of regenerated cellulose sausage casings has been generally unsatisfactory as a result of the poor adhesion of the ink to the relatively moist surface of the sausage casing. Also, flexographic printing has not proved sufficiently adherent to sausage casings to withstand the abuse encountered in presoaking and stuffing of the casing. Oil base printing inks have been used successfully in the printing of regenerated cellulose sausage casings. The printing inks have been selected for superior properties of adhesion toward regenerated cellulose having a high glycerin and water content. The drying oil printing inks, which have been used comprise a pigment or mixture of pigments, a vehicle drying by oxidation, and a drying agent or mixture of drying agents.

Vehicles drying by oxidation consist mainly of a drying oil or mixture of drying oils, such as unsaturated animal or vegetable or synthetic oils which oxidize and polymerize when exposed to the air in a thin film, leading ultimately to a solid and tough but flexible film. The drying oil of the printing ink vehicle may be linseed oil, tung oil, perilla oil, oiticica oil, soybean oil, and synthetic drying oils of petroleum origin. Chemically modified drying oils such as dehydrated castor oil or drying animal oil modified to free it from objectionable odor are also used. In most cases, the drying oils used in printing inks are bodied oils. Drying oil printing inks present two problems in the printing of regenerated cellulose sausage casings. Firstly, the ink must dry to the touch rapidly so that it will not block when the printed pieces of casing are stacked one on another. Secondly, the printing ink which has been dried to the touch must dry entirely by forming a chemical and/or physical bond to the substrate, i.e., clear regenerated cellulose or fibrous casings. The solution of the first problem has been relatively easy since the speed of drying, i.e., the formation of dry, nonblocking surface layer or film, can be controlled and/or accelerated by appropriate selection of drying agents such as the various metal naphthenates, which are well known in the printing art for improving the drying characteristics of oil base printing inks. The attainment of adhesion of the ink to the substrate within a reasonable time after printing has been more difficult and has not had a satisfactory solution.

Attempts have been made to solve the problem of adhesion of oil base inks to a regenerated cellulose substrate by controlled drying over a period of time. For example, a special process step consisting of a high temperature treatment in an approximately 55% R.H. atmosphere has been considered necessary if the printing ink was to adhere properly to a regenerated cellulose sausage casing. This treatment, which was necessary to produce sufficient adhesion of the imprint to the regenerated cellulose casing and resistance of the imprint to abrasion and boiling water, has had the disadvantage that it tends to embrittle and weaken the casing at the edges. The after treatment for improving adhesion of the imprint to a regenerated cellulose casing has also had the disadvantage of altering the shades of pigment used in the printing ink so that the finished print is not always uniform and does not always match the color required by the customer.

Other attempts have been made to overcome the problem of adhesion of printing inks to regenerated cellulose casings by incorporation of certain reactive materials in a printing ink composition to cause the ink to adhere chemically to the substrate. Adams U.S. Pat. No. 3,316,189 and Heiss, et al. U.S. Pat. No. 3,245,810 disclose printing ink compositions wherein a reactive material is admixed with an oil base printing ink to promote the adhesion of the ink to regenerated cellulose sausage casing or similar cellulosic substrate. The compositions described in the patents have the disadvantage that there is some tendency of the reactive constituent to set up on storage, or to react with moisture absorbed from the atmosphere, or to polymerize with heat to cause the printing ink to gel or harden. These printing ink compositions, therefore, have somewhat uncertain pot lives and require extreme care in handling.

STATEMENT OF OBJECTS AND FEATURES

Accordingly, it is one object of this invention to provide an improved process of printing regenerated cellulose which results in improved adhesion and accelerated drying rate.

Another object of this invention is to provide an improved process of printing regenerated cellulose casings with improved ink adhesion and accelerated ink drying.

A further object of this invention is to provide a new and improved process for printing regenerated cellulose casings wherein the imprint will adhere tenaciously even after being soaked in boiling water for 10 minutes.

A feature of this invention is the provision of an improved process for printing regenerated cellulose wherein the cellulose article is primed with a reactive primer composition prior to printing.

Another feature of this invention is the provision of a new and improved process for printing regenerated cellulose sausage casings wherein the casing is provided with a primer coating of a polymeric polyisocyanate, dried, and then imprinted with an oil base ink or a flexographic ink.

Another feature of this invention is the provision of a new and improved process for preparing printed regenerated cellulose sausage casings which are not susceptible to bowing when sausages are prepared therein.

Other objects and features of this invention will become apparent from time to time throughout the specification and claims as hereinafter related.

SUMMARY OF THE INVENTION

In accordance with this invention it has been discovered that regenerated cellulose sausage casings, both of the clear, regenerated cellulose and fibrous types, can be printed either with oil base or flexographic inks with improved adhesion and improved drying of the printing ink, and are not susceptible to bowing when sausages are processed therein. The casing is first provided with a primer coating of a polymeric polyisocyanate, preferably applied in solution, and optionally containing a polyester modifier, and the primer coat dried prior to printing. The polymeric polyisocyanate is applied to at least substantially all of the external surface of the casing in solution in an active solvent with little or no free hydroxyl groups present, e.g., esters such as alcohol-free ethylacetate, and ketones such as methylethyl ketone. After the primer coating is applied to at least substantially all of the casing surface and dried, the casing is printed with the desired imprint applied either in an oil base ink or a flexographic ink. In either case there is substantially improved adhesion between the ink and the casing, there is more rapid drying of the ink to produce a non-offsetting film in substantially less time, and the casing is not susceptible for causing bowing of sausages processed therein.

DESCRIPTION OF THE PREFERRED EMBODIMENTS

In carrying out this invention, a clear regenerated cellulose sausage casing or a fibrous casing is provided with a primer coating of a polymeric polyisocyanate in preparation for printing. The polymeric polyisocyanate is applied to the casing in solution in an active solvent, such as alcohol-free ethylacetate (or other esters), or methylethyl ketone (or other ketones). It is essential that the isocyanate be applied in solution in a solvent which is essentially free of hydroxyl groups.

The polymeric polyisocyanate applied to the casing as a primer must be sufficient to produce a thin film over the primed area in an amount sufficient to cause the adhesion of the ink to the regenerated cellulose surface, when imprinted and air dried thereon. The amount of polymeric polyisocyanate primer applied is controlled to some extent by the concentration of the solution in which it is applied and also the amount of the primer solution applied. Generally, a 6% wt. solution of the isocyanate in an active solvent is sufficient to coat and prime the surface of cellulose casing for subsequent imprinting with oil based inks. A 15 – 20% solution is necessary for priming cellulose casing in preparation for flexographic printing. The concentration of isocyanate in the solution is not critical but too high a concentration, e.g., in excess of about 30%, will cause an impenetrable film to be formed such that the performance of the casing is impaired, particularly since the film tends to prevent the smoking of the sausages formed in the casing.

In practicing the invention, the primer coat is applied to the cellulose casing prior to imprinting with ink. This is done so that the surface will be receptive to the ink and permit excellent adhesion and rapid drying when the ink is imprinted over the surface. The coating is applied substantially uniformly about the external surface of the casing and particularly substantially uniformly about that external area perpendicular to any given section of the longitudinal axis of the casing. The primary reason for uniformly coating this area is that the primer coating often affects the properties of the casing. If the casing is coated on a side, i.e., not coated uniformly on the area perpendicular to the longitudinal axis, the sausages processed therein may be bowed or banana-shaped. Accordingly, by coating substantially all of the external surface (at least 95%), even though some uncoated spaces may exist between coated areas, the sausages produced in these casings will be substantially straight.

The primer may be applied at a first station of a multi-station printing press or may be applied by a separate in-line coating operation at the input to the printing press. It may also be applied in a separate off-machine coating operation completely separated from the printing of the casing. After the primer coating is applied and dried, the oil base or flexographic ink is applied in one or more steps, usually with intermediate drying of the ink in the case of multi-colored printing. The oil base and flexographic inks applied to the primer coated cellulose casing dry more rapidly to the touch and adhere more tenaciously to the casing through subsequent processing. Imprints made over the primed casing have superior adhesion to the casing and do not coome off when soaked in boiling water for 10 minutes or as a result of the stretching which occurs when the casing is stuffed. Further, sausages processed in such casings are not "banana-shaped" as commonly occurs where a primer coat is applied to that portion of the casing which is imprinted.

EXAMPLE 1

The primer composition was prepared by dissolving a polyurethane polyisocyanate (Marlon Catalyst No. 383) in methylethyl ketone at a 6% wt. concentration.

The primer solution prepared above was applied to several pieces of fibrous casing (regenerated cellulose casing reinforced with a hemp fiber paper) as a thin layer over a portion of the surface area and to several pieces over substantially all of the surface (at least 95% coated), and dried. The primer coating was an essentially colorless, transparent, slightly tacky, pressure sensitive coating. Next, a first down oil base ink was applied to the primed surface and allowed to dry. The ink used was Alden & Ott 5650 White first down ink which comprises a mixture of pigment, metallic drier (e.g., cobalt naphthenate), alkyd resin and a resin hardener (e.g., cellulose acetate butyrate) in a drying oil (e.g., linseed oil, tung oil, etc.).

In each instance the first down ink imprint over the primed surface was dry to the touch in less than 4 hours and developed satisfactory adhesion to the fibrous casing within 24 hours. The printed casing could be subjected to immersion in boiling water for 10 minutes and could be stretched in the same manner as a stuffed sausage casing without the imprint coming off. When fibrous casing was imprinted with the same printing ink, without the primer coating, the development of proper adhesion between the imprint and the casing required usually from about 2 to 3 days.

In other experiments, the casing primed as described above was imprinted with a second down yellow oil base ink (Sleight-Hellmuth 52221) and also with a third down blue oil base printing ink (I.P.I. 93524). In each case the ink was dry to the touch in less than 4 hours and full adhesion developed within 24 hours. When these printing inks were applied to unprimed casing, the drying time for development of full adhesion to the casing required from 2 to 6 days or more.

On the other hand, sausages processed in the casings where the primer coating was only applied to a portion of the casing surface and subsequently imprinted were banana-shaped. But, where the fibrous casing was coated over substantially all of the external surface, dried, and then imprinted with ink, the sausages processed therein were straight, unbowed, and satisfactory for market.

EXAMPLE 2

A primer coating solution was prepared by dissolving a polymeric polyisocyanate (Mondur polyurethane polyisocyanate) in alcohol free ethylacetate at a 6% wt. concentration.

The primer solution was applied to a portion of external surface of several clear regenerated cellulose casings (Tee-Pak Miscellaneous and Wienie-Pak casing) and to the entire external surface of other casings as a thin layer, and dried. The primer coating consisted of a transparent, slightly tacky, pressure sensitive coating.

Next, the primed casings were imprinted with an oil base printing ink, viz., Sleight-Hellmuth 52221 second down yellow. The imprint was dry to the touch in less than 4 hours and developed full adhesion to the casing in 24 hours or less. When the same ink was applied to clear regenerated cellulose casing which had not been primed, full adhesion developed only after 2 to 6 or more days storage.

Sausages processed in the casings having the primer coat applied to the entire surface were straight whereas sausages prepared from the casings where only a portion of the cellulose casing was coated with a primer solution were banana-shaped.

EXAMPLE 3

A primer solution was prepared by dissolving Polybond polyisocyanate GA-83-C in methylethyl ketone at a concentration of 6% wt.

The primer coating was applied to the external surface of several clean regenerated cellulose casing (Tee-Pak Miscellaneous and Wienie-Pak casing) and to a portion of the surface of other identical casings as a thin layer, and dried. The primer coating consisted of a transparent, slightly tacky, pressure sensitive coating.

Next, an oil base printing ink, viz., I.P.I. 93524 third down blue, was imprinted over the primed surface. The imprint was dry to the touch in 4 hours or less and developed full adhesion in less than 24 hours. When this ink was used to imprint unprimed casing, 2 to 6 or more days drying time were required for development of full adhesion of the ink to the casing.

In other experiments, wherein Alden & Ott 5650 first down white oil base printing ink and Sleight-Hellmuth 52221 second down yellow printing ink were applied over the primed casing, it was found that the imprint was dry to the touch in less than 4 hours and that full adhesion developed within less than 24 hours.

Sausages processed in casings having the primer coating applied over the entire surface of the casing were straight whereas those having the primer coat applied to a portion of the casing were bowed.

EXAMPLE 4

A series of runs were made on commercial printing equipment to test the effectiveness of this printing process. A primer solution was prepared by dissolving Mondur CB-75 in alcohol free ethylacetate at a 6% wt. concentration. The primer solution was applied to both clear regenerated cellulose casing (Tee-Pak Miscellaneous and Wienie-Pak casing) and fibrous casing by a coating applicator positioned in line with a Young printing press. The entire external surface of casing was coated with the applicator, passed through a drying tunnel, and then fed through the Young press to apply a first down ink, viz., alden & Ott 5650 first down white oil base ink. In these runs the first half of each run was printed on the Young press with the primer coating applied as a preliminary coating, and the second half of the run was printed without the primer coating.

The imprinted fibrous casing taken from the press was dry to the touch within 1 hour after printing. The imprinted primed nonfibrous regenerated cellulose casing had excellent ink adhesion within 16 hours after printing. A stretch curve analysis of the primed casing versus unprimed casing revealed that the change in stretch characteristics was negligible. Also, there was no degradation of the casing as a result of the primer or the printing applied on the casing.

During these test runs, 100 pieces of the clear regenerated cellulose casing with a first down color imprint were taken directly from the press after they were printed and immediately overwrapped with paper, then cardboard, and then paper again, to determine whether they would dry properly in the presence of limited quantities of air for oxidation. When this package of casing was opened 4 days later the imprint was found to be completely dry and fully adherent to the casing. This experiment clearly demonstrates that the casings can be packaged shortly after printing and will develop full adhesion during shipping to the customer.

EXAMPLE 5

The external surface of a clear regenerated cellulose casing was coated with a primer solution of the same composition used in Example 1. The coating, after drying, consisted of a clear, transparent, slightly tacky, pressure sensitive coating over the area to be imprinted. Several pieces of the primed casing were imprinted in a flexographic printing press in separate runs using different types of conventional flexographic printing inks. Flexographic printing inks consist generally of resins, plasticizers, pigments, and solvents. The printing inks used in these experiments were Flexo-Tuf (a polyamide base ink), Plio-Lox (an acrylic base ink), and ICI cellulose ink (a nitrocellulose base printing ink).

When the primed casings were imprinted with each of the above-mentioned flexographic printing inks, the imprint was dry to the touch as it came off the printing press and developed full adhesion to the casing on overnight storage. When these printing inks were used to imprint unprimed casing, the imprint was dry to the touch as it came off the press, but adhesion to the casing never developed even upon extended storage.

Additional runs were made in which clear regenerated cellulose casing (Tee-Pak Miscellaneous and Wienie-Pak casing) was primed with a primer solution of 15 - 20% wt. isocyanate (Mondur CB-75). The primed casing was printed flexographically using the polyamide, acrylic, and nitrocellulose flexographic inks described above. The imprints were dry to the touch as the casing was removed from the press and developed full adhesion to the casing on overnight storage.

In carrying out the improved printing process of this invention in flexographic printing, it should be noted that toluene and other aromatic solvents may not be employed as a primer solvent for application of a primer coating, in flexographic printing presses and other presses where the presses have rubber rolls which are attacked by the solvents. Of course, aromatic solvents may be used where the presses are modified by substitution of solvent resistant synthetic rubber rolls. It should also be noted that while the process has been described with special emphasis upon the use of polyether urethanes, i.e., polymeric polyisocyanates, having free isocyanate functionality, other polymeric polyisocyanates such as polyester urethanes, containing free isocyanate functionality, can be employed. The free isocyanate functionality in general comprises a plurality of isocyanate functions per molecule and is generally pendant from a polymer chain.

While this invention has been described fully and completely with special emphasis upon several preferred embodiments, it is to be understood that within the scope of the appended claims the invention may be practiced otherwise than as specifically described herein.

I claim:

1. A process for producing a printed regenerated cellulose sausage casing which comprises coating substantially all of the external surface area of the casing with a film-forming primer coating comprising a solution of a film-forming polymeric polyisocyanate in an active, hydroxyl free solvent, drying the primer coating thereby producing a tacky, pressure sensitive film, and then imprinting a portion of the primer coated regenerated cellulose casing with an oil base printing ink or flexographic printing ink.

2. A process as defined in claim 1 in which the polymeric polyisocyanate is a polyether urethane containing free isocyanate functionality or a polyester urethane containing free isocyanate functionality.

3. A process as defined in claim 2 in which the printing ink is a flexographic ink and the primer is applied as a solution containing about 15 - 20% of the polymeric polyisocyanate.

4. A process as defined in claim 2 in which the printing ink is an oil based ink and the primer coating is applied as a solution of about 6% wt. of the polymeric polyisocyanate in said solvent.

5. A process as defined in claim 2 in which the solvent for the primer coating is an alcohol free solvent of a group consisting of esters, low alkyl ketones, and toluene.

6. A process as defined in claim 1 in which said primer solution consists essentially of a solvent solution of said polymeric polyisocyanate.

7. An imprinted regenerated cellulose casing produced by the method of claim 1.

* * * * *